United States Patent [19]
Appleby et al.

[11] 3,921,257
[45] Nov. 25, 1975

[54] APPLIANCE FOR LINEAR BODIES
[75] Inventors: Harry Allen Appleby, Cleveland; Frank Albert, Jr., Parma, both of Ohio
[73] Assignee: Preformed Line Products Company, Cleveland, Ohio
[22] Filed: Dec. 18, 1973
[21] Appl. No.: 425,884

[52] U.S. Cl............ 24/122.6; 24/115 M; 403/194; 174/DIG. 12; 24/115 N
[51] Int. Cl.².................. F16G 11/03; F16G 11/04
[58] Field of Search........... 24/115 R, 131 C, 122.6; 403/194; 174/DIG. 12

[56] References Cited
UNITED STATES PATENTS

| 656,187 | 8/1900 | Gunnell | 24/115 R |
|---|---|---|---|
| 2,766,501 | 10/1956 | Kellems | 24/115 R |
| 3,219,298 | 11/1965 | Ruhlman | 174/DIG. 12 |
| 3,291,507 | 12/1966 | Clay | 24/115 R |
| 3,334,663 | 8/1967 | Peterson | 24/131 C |
| 3,573,346 | 4/1971 | Appleby | 24/115 R |
| 3,739,457 | 6/1973 | Davis | 24/122.6 |
| 3,786,554 | 1/1974 | Little | 24/115 R |

FOREIGN PATENTS OR APPLICATIONS

| 980,702 | 9/1952 | France | 24/122.6 |
|---|---|---|---|
| 202,281 | 9/1908 | Germany | 24/122.6 |

*Primary Examiner*—Bernard A. Gelak
*Attorney, Agent, or Firm*—Hume, Clement, Brinks, William, Olds & Cook, Ltd.

[57] ABSTRACT

There is disclosed a termination appliance for a load-bearing cable of the type having a housing for receiving and gripping the cable, specifically an improvement therein for alleviating fatigue at the point of exit of the cable from the housing. An enlarged annular flange, secured to the housing and positioned about the exit aperture, includes a series of peripheral locating apertures spaced a substantial distance radially outwardly of the cable. A series of helically preformed rods each has one end disposed through a respective locating aperture. The rods extend forwardly therefrom, tapering naturally into a helically wrapped gripping engagement with the cable. A resilient material, such as polyurethane, is integrally molded about the forward extending portion of the helical rods. Other features are disclosed.

10 Claims, 3 Drawing Figures

APPLIANCE FOR LINEAR BODIES

INTRODUCTION

The present invention relates generally to appliances for linear bodies and, more particularly, is directed to improvements in termination or dead-end type appliances for load bearing cables or the like. Specifically, the present invention relates to improvements in such devices for alleviating fatigue or bending stresses at the point of exit of the cable from the termination appliance housing.

SUMMARY OF THE INVENTION

It has long been recognized that the portion of a cable adjacent a termination appliance is subject to extraordinary stresses since the cable within the appliance is held in a rigid position while that portion of the cable immediately beyond the appliance is free to flex. These stresses may result in a premature fatigue and rupture of the cable at or adjacent its point of entry into the termination appliance.

The improvement of the present invention alleviates materially the bending stresses on the cable at its point of exit from the termination appliance and distributes these stresses over a considerably greater length of the cable. Accordingly, the ability of the cable to withstand exceptional bending stresses over a prolonged period is greatly enhanced.

The present invention relates to a termination appliance for a load-bearing cable of the type having a housing for receiving and gripping the cable. More particularly, the invention is directed to the improvement comprising a support means secured to the housing and disposed about and radially outwardly of the point of exit of the cable from the housing. Helically preformed rod means comprising a plurality of helically preformed rod elements each having a portion of a predetermined pitch length and a nominal internal diameter less than that of said cable are also provided. Each of the helical rod means has one end in engagement with the support means at a respective peripheral location thereof which is spaced a predetermined angular interval from an adjacent location and spaced a substantial distance radially outwardly of the cable. Portions of the rod elements extend forwardly from the support means and taper into a helically wrapped gripping engagement with the cable. It is also preferred that a resilient means, such as polyurethane, be integrally formed or molded about the forwardly extending portion of the rod elements so as to effectively encase the rod elements.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
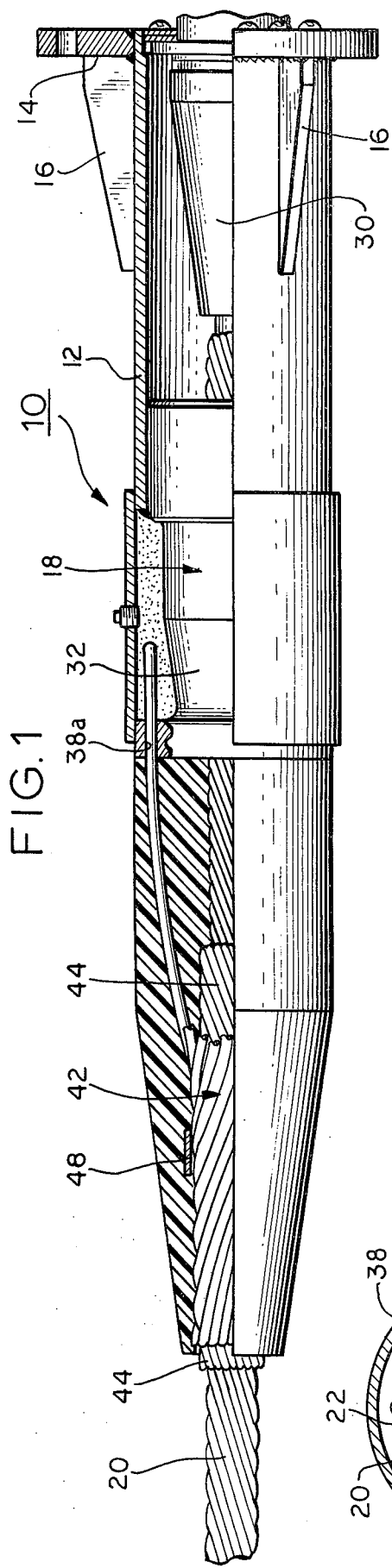
FIG. 1 is a side elevation, partly in section, of a termination appliance or dead-end device embodying the teachings of the present invention.

Referring now to FIG. 1, the termination appliance 10 there illustrated may, except for features of the invention presently to be described, be closely similar to the structure disclosed and claimed in U.S. Pat. No. 3,573,346—Appleby, assigned to the same assignee as the present invention. Specifically, the appliance 10 comprises an elongated hollow housing portion 12 one end of which is provided with an enlarged flange 14 for securing the appliance 10 to a support. The flange 14 is welded to the exterior circumference of the housing 12 and is further secured to the housing by a series of longitudinal support struts 16 disposed at spaced intervals about the circumference of the housing 12 and welded both to the housing and to the adjacent face of the flange 14.

There is inserted near the forward end of the cylindrical housing 12 a rearward portion of an assembly 18 that will momentarily be described in detail. That portion of the assembly 18 inserted within the housing 12 is of a mating cylindrical dimension so as to effect a snug interfit with the housing 12 and the assembly 18 is fixedly secured thereto either by welding or by suitable fasteners. The assembly 18 serves to grip and hold an elongated cable 20 that is slidably inserted into the forward end of the assembly 18, i.e., the left-hand side of assembly 18 in the drawing. The opposite end of the cable 10 extends rearwardly of the assembly 18, i.e., in the direction of the flange 14.

Figure 2:
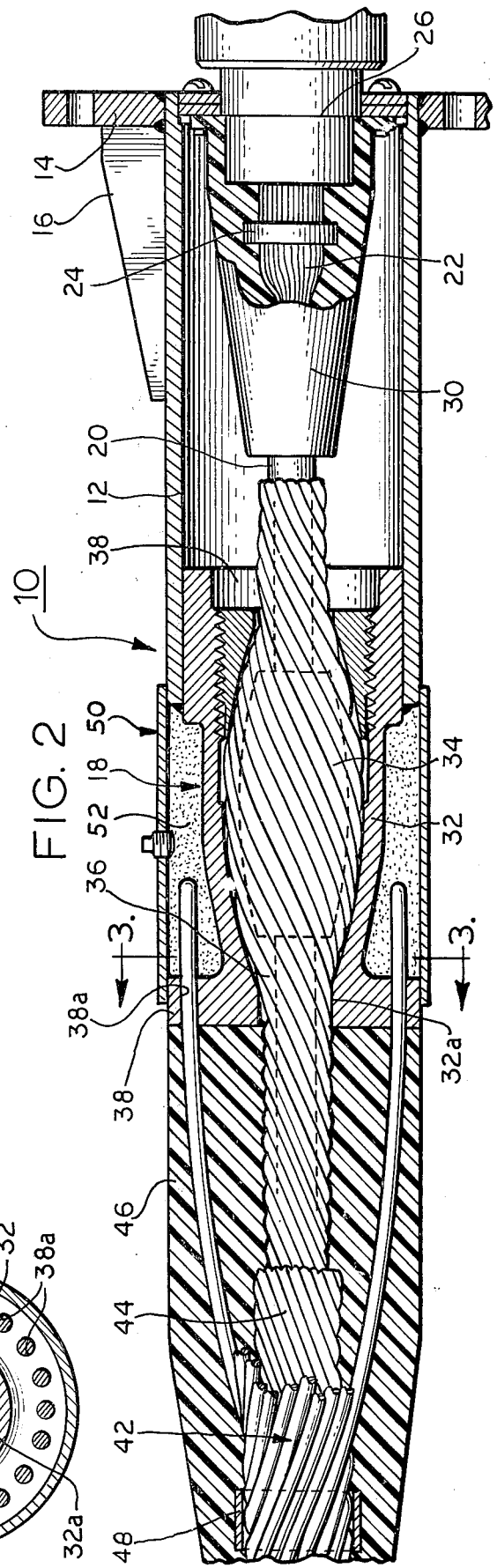
FIG. 2 is an enlarged longitudinal section of a portion of the device of FIG. 1.

In the exemplary embodiment illustrated, the load-bearing cable 20 includes a number of electrical signal conductors running along its core. A stress-free interconnection of these signal conductors with other signal conductors is effected in a splicing cavity defined in the rearward portion of the housing 12. Specifically, as shown in part in FIG. 1 and more fully in FIG. 2, the electrical signal conductors 22 extending from the terminus of the cable 20 are arranged in an appropriately aligned fashion by insertion through respective holes in a circular plate 24. The individual wires 22 are then soldered or otherwise connected to appropriate terminals of a conventional water-proof electrical connector 26 that is threadably secured to the end of the housing 12 contiguous the flange 14. A mated external fitting for the electrical connector 26 is shown in part in FIG. 2. Preferably, the connector 26 is secured within the end of the housing 12 so as to effect an hermetic seal therewith. It is also preferred for protective purposes that the electrical signal conductors be encased in a protective polyurethane or neoprene type material. In the present embodiment, the rearward portion of the connector 26 as well as the signal conductor 22 are encased in a polyurethane mass 30 intimately molded thereabout. The mass 30 is of a generally frusto-conical contour with its enlarged end contiguous the backside of the connector 26.

The cable 20, as previously mentioned, is fixedly secured within the assembly 18. As seen most clearly in FIG. 2, the assembly 18 is composed of a rigid metal shell 32 having a somewhat egg-shaped internal contour and a generally cylindrical external contour. The housing 32 is apertured at each of its opposite ends and the apertures are aligned along the longitudinal axis of the egg-shaped internal housing contour. The cable 20, as shown in dotted outline in the drawing, passes entirely through the housing 32. An ellipsoidally contoured member 34, visible only in dotted outline in the drawing, is disposed about the cable 20 within the housing 32. A full lay of helically preformed rods 36 are disposed over the ellipsoidal member 34 and extend in opposite directions therefrom in secure gripping relation with the cable 20. The ellipsoidal or egg-shaped protuberance formed by the member 34 and the overlying helical rods 36 fits snuggly in the mating contour of the forward portion of the housing 32 with the cable 20 and overlying helical rods 36 extending through the forward aperture 32a of the housing 32. A plug 37 having a central aperture for passing the cable 20 and the overlying helical rods 36 is threadably secured in the backside of the housing member 32 with the contoured surfaces of the plug snuggly fitting against the egg-shaped contour of the rearward portion of protuberance assembly 34,36. Further details of the structure of the cable gripping assembly 18 as well as methods for its assembly are set forth in detail in U.S. Pat. Nos. 3,007,243—Peterson and 3,723,636—Eucker, both assigned to the same assignee as the present invention. Since the particulars of such structures form no part of the present invention and are set forth in detail in the aforesaid patents, no further description will be made here.

In conventional termination appliances, the cable exiting from the lower end of an appliance housing, such as the aperture 32a of the housing 32, is potentially subject to extraordinary bending stress by reason of the abrupt transition from a rigidly held cable to a freely flexible cable. If the terminated cable experiences in its environment of use a good deal of flexure, it is probable that fatigue of the cable will first occur adjacent to the aforesaid transition point.

Figure 3:
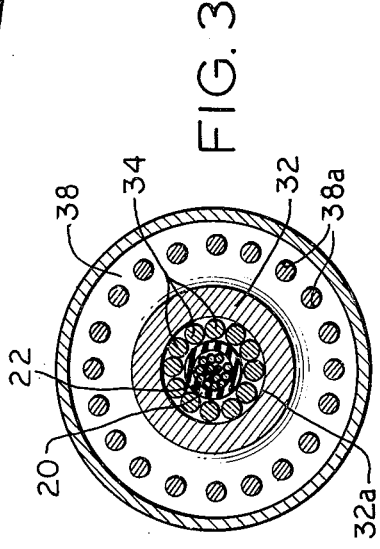
FIG. 3 is a cross-sectional view taken along lines 3—3 of FIG. 2.

In accordance with the present invention, the stress to which the cable 20 would normally be subject at the point of its exit from the housing 32 is substantially alleviated. More specifically, the present invention contemplates a distribution of the stress normally concentrated at or about the point of exit of the cable from the housing over an elongated section of the cable 20. To this end, there is provided a support means 38 secured to the housing 32 and disposed about and radially outwardly of the aperture 32a in the housing 32. In the present embodiment, the support means 38 comprises an enlarged annular flange integral with the lower end of the housing 32 and oriented transversely to the axis of the cable 20. The flange 38, as seen most clearly in FIG. 3, includes a plurality of angularly spaced peripheral apertures 38a formed in the flange 38 by drilling or the like. The apertures 38a are spaced from one another by regular angular intervals and are disposed a substantial and constant radial distance outwardly of the cable 20.

The individual apertures 38a in the flange 38 each receive a respective end portion of one element of a set of helically preformed rods, the rods being collectively referred to in the drawing by the numeral 42. Preferably, the end portions of the helical rod elements 42 are of a generally nonhelical or linear configuration to facilitate their insertion into the apertures 38a. Also, the initial portions of the helical elements 42 extending forwardly of the flange 38 preferably are formed to make a gradual transition from a non-helical to a helical contour. The rod elements 42 assume a predetermined pitch length and a nominal internal diameter less than that of the cable structure which they are to grip as the rods come into engagement with the cable. In this regard, the cable 20, for reasons unrelated to the present invention, is provided with an overlay of helical rods 44 to provde a thickened core about which the helical rods 42 are wrapped in tightly gripping relation. The helical rod elements 42, supported as they are in spaced relation to the cable 20 at the point of exit of the cable from the housing 32 and gradually tapering into a gripping relation with the cable a significant distance beyond the exit point, have been found to provide a substantial alleviation of the cable fatigue problem normally incurred in termination appliances.

It has further been found desirable in a number of applications to provide an effective reenforcement of the helical elements 42, particularly in the region adjacent the exit aperture 32a of the housing 32. To this end, it is presently preferred that the helical rods 42 be encased in a plastic-like material 46, such as polyurethane, that is intimately molded about the rods in situ. This molded encasement 46 is of an outer diameter coincident with that of the flange 38 and preferably the surface of the flange 38 is suitably prepared to assure a secure bonding between the plastic material 46 and the contiguous face of the flange 38, although such is not essential to the invention. The plastic-like material 46 extends forwardly of the flange 38 at a constant cylindrical diameter for a predetermined distance and thereafter tapers conically for a substantial distance, and is disposed in overlying relation to the helical rod elements 42 for the entirety of their length.

In order to maintain a proper alignment of the helical rods 42 and their proper engagement with the underlying cable, it is also preferred to dispose a metal band 48 about the helical rods 42 just beyond the point of their initial gripping engagement with the underlying cable.

In order to avoid snagging of the terminal portions of the helical rods that extend through the apertures 38a of the flange 38, it is also preferred to snugly fit a sleeve 50 over the flange 38 and the adjacent portion of the housing 12. It has also been found desirable in some cases to fill the chamber formed between the sleeve 50 and the housing 32 with a lubricant 52, such as grease, that is not soluable in water. The lubricant prevents corrosion of the surrounding metal components and also lubricates the end portions of the rods 42 that slide within the apertures 38a of flange 38. The composite structure described has demonstrated a remarkable ability to protect the cable 20 from fatigue resulting from exceptional bending and flexure.

While particular embodiments of the present invention have been shown and described, it is apparent that various changes and modifications may be made, and it is therefore intended in the following claims to cover all such modifications and changes as may fall within the true spirit and scope of this invention.

We claim:

1. A termination appliance for a load bearing cable, comprising:
   cable gripping means comprising a housing member having an aperture for receiving said cable;
   support means secured to said housing and disposed radially outwardly of said aperture;
   helical rod means comprising a plurality of helically preformed rod elements each having one end in engagement with said support means at a respective peripheral location of said support means spaced a predetermined angular interval from an adjacent location and spaced a substantial distance radially outwardly of said cable, a portion of said rod elements extending forwardly from said support means and tapering into a helically wrapped engagement with said cable for alleviating bending fatigue on said cable at the point of exit of said cable from said housing; and means engaging the forwardly extending portions of said rod elements for reinforcing said helical rod means, said reinforcing means including a resilient plastic-like material in which said forwardly extending portion of said rod elements is encased.

2. The termination appliance of claim 1 in which said reinforcing means is of a first predetermined thickness adjacent said support means and decreases in thickness along said forwardly extending portion of said rod elements.

3. The termination appliance of claim 1 in which said support means comprises an annular flange on said housing having a plurality of angularly spaced peripheral apertures for passing respective ones of said helical rod elements.

4. The termination appliance of claim 1 and further comprising enclosure means defining in cooperation with said flange a chamber for enclosing those portions of said helical rod elements extending rearwardly of said flange.

5. The termination appliance of claim 1 and further comprising lubricant means disposed within said chamber.

6. The termination appliance of claim 1 in which said helical rod elements each include a generally non-helical, linear portion for extending through said apertures and extending forwardly therefrom for a predetermined distance.

7. The termination appliance of claim 1 in which said plastic-like material comprises a polyurethane-like material.

8. The termination appliance of claim 1 and further comprising an annular ring closely encompassing said helical rod elements adjacent the point at which said helical rod elements are wrapped about said cable.

9. The termination appliance of claim 1 wherein the forwardly extending portion of each said rod element is helically wrapped in gripping relationship about said cable.

10. In a termination appliance for a load-bearing cable of the type having a housing for receiving and gripping said cable, the improvement for alleviating fatigue at the point of exit of said cable from said housing, comprising:

support means secured to said housing an disposed radially outwardly of the point of exit of said cable from said housing;

helical rod means comprising a plurality of helically preformed rod elements each having one end in engagement with said support means at a respective peripheral location of said support means spaced a predetermined angular interval from an adjacent location and spaced a substantial distance radially outwardly of said cable, a portion of said rod elements extending forwardly from said support means and tapering into a helically wrapped engagement with said cable; and resilient means integrally formed about and encasing said forwardly extending portion of said rod elements.

* * * * *